US010901428B2

(12) United States Patent
Georges et al.

(10) Patent No.: US 10,901,428 B2
(45) Date of Patent: Jan. 26, 2021

(54) WORKING CONDITION CLASSIFICATION FOR SENSOR FUSION

(71) Applicant: Intel IP Corporation, Santa Clara, CA (US)

(72) Inventors: Munir Georges, Kehl (DE); Moinul Islam Al-Mamun, Feldkirchen (DE)

(73) Assignee: INTEL IP CORPORATION, Santa Clara, CA (US)

( * ) Notice: Subject to any disclaimer, the term of this patent is extended or adjusted under 35 U.S.C. 154(b) by 334 days.

(21) Appl. No.: 15/857,670

(22) Filed: Dec. 29, 2017

(65) Prior Publication Data
US 2019/0049986 A1 Feb. 14, 2019

(51) Int. Cl.
G05D 1/02 (2020.01)
G07C 5/08 (2006.01)
G01M 11/08 (2006.01)
G07C 5/00 (2006.01)
G05D 1/00 (2006.01)
G01S 13/931 (2020.01)
B60W 30/095 (2012.01)
G01S 17/86 (2020.01)
G01S 17/931 (2020.01)
G01S 13/86 (2006.01)

(52) U.S. Cl.
CPC ......... *G05D 1/0238* (2013.01); *B60W 30/095* (2013.01); *G01M 11/081* (2013.01); *G01S 13/931* (2013.01); *G01S 17/86* (2020.01); *G01S 17/931* (2020.01); *G05D 1/0038* (2013.01); *G05D 1/0088* (2013.01); *G07C 5/008* (2013.01); *G07C 5/085* (2013.01); *G07C 5/0808* (2013.01); *G01S 13/865* (2013.01); *G01S 13/867* (2013.01); *G01S 2013/9318* (2020.01); *G01S 2013/9319* (2020.01); *G01S 2013/9322* (2020.01); *G01S 2013/93185* (2020.01)

(58) Field of Classification Search
None
See application file for complete search history.

(56) References Cited

U.S. PATENT DOCUMENTS

| 9,221,396 | B1* | 12/2015 | Zhu | G06K 9/00791 |
| 9,274,525 | B1* | 3/2016 | Ferguson | G01S 7/4972 |
| 9,555,883 | B1* | 1/2017 | Navot | B64C 39/02 |
| 9,915,947 | B1* | 3/2018 | LaForge | G05D 1/0077 |
| 10,249,109 | B1* | 4/2019 | Konrardy | B60W 10/18 |
| 10,551,838 | B2* | 2/2020 | Liu | G05D 1/0246 |
| 2016/0137209 | A1* | 5/2016 | Stainvas Olshansky | G01D 18/008 701/301 |
| 2018/0113193 | A1* | 4/2018 | Huemer | G01S 7/4056 |
| 2019/0041494 | A1* | 2/2019 | Roger | G01S 13/87 |

* cited by examiner

*Primary Examiner* — Richard M Camby
(74) *Attorney, Agent, or Firm* — Viering, Jentschura & Partner MBB

(57) ABSTRACT

Herein is disclosed a sensor data evaluation system comprising one or more first sensors, configured to deliver first sensor data to a first sensor frontend; the first sensor frontend, configured to generate a first sensor frontend output corresponding to the first sensor data and to deliver the first sensor frontend output to a second sensor frontend; and the second sensor frontend, configured to receive second sensor data from one or more second sensors; and modify a second sensor parameter based at least on the first sensor frontend output.

17 Claims, 4 Drawing Sheets

WORKING CONDITION CLASSIFICATION FOR SENSOR FUSION

TECHNICAL FIELD

Various aspects of the disclosure relate generally to processing of data from multiple sensors.

BACKGROUND

Autonomous vehicles rely on a variety of sensors to execute autonomous driving decisions. It is known for raw data from similar sensors to be processed by one of the plurality of sensor frontend devices. Such processing involves summarizing the sensor data and transmitting the summarized data to a fusion unit, where the various summaries are combined. This set of combined summaries is then transmitted into an autonomous driving circuit for analysis according to various algorithms, from which the autonomous driving circuit makes driving decisions. Under this system, data from different types of frontend devices is first combined in the fusion unit, and the various frontend devices are unable to consider data from other frontend devices in the processing of their own data streams.

SUMMARY

Herein is disclosed a sensor data evaluation system comprising one or more first sensors, configured to deliver first sensor data to a first sensor frontend; the first sensor frontend, configured to generate a first sensor frontend output corresponding to the first sensor data and to deliver the first sensor frontend output to a second sensor frontend; and the second sensor frontend, configured to receive second sensor data from one or more second sensors; and modify a second sensor parameter based at least on the first sensor frontend output.

Herein is disclosed a sensor data evaluation system comprising one or more first sensors, configured to deliver first sensor data to a first sensor frontend; the first sensor frontend, configured to generate a first sensor frontend output corresponding to the first sensor data and to deliver the first sensor frontend output to a second sensor frontend; and the second sensor frontend, configured to receive second sensor data from one or more second sensors; and modify a second sensor parameter based at least on the first sensor frontend output.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
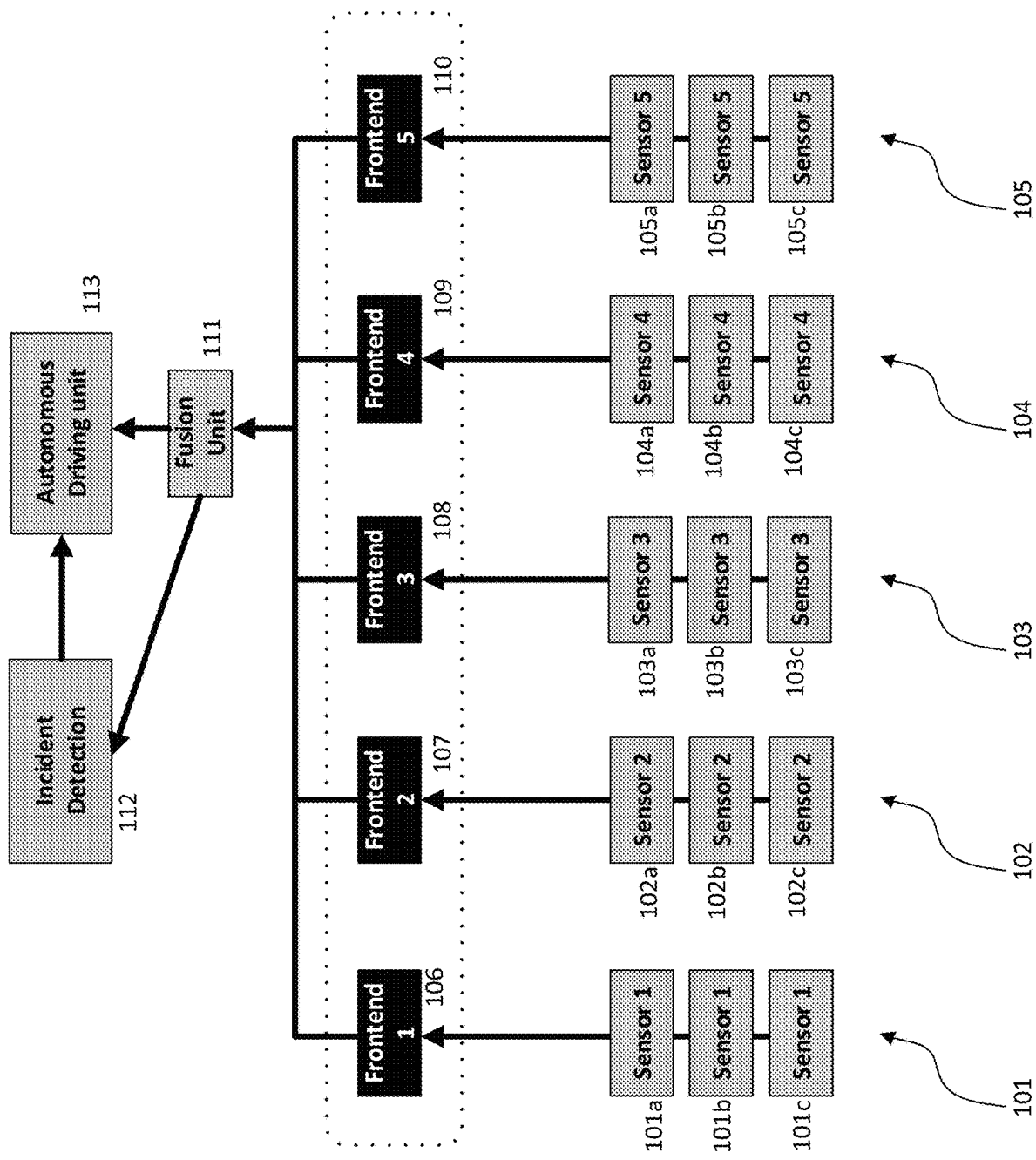
FIG. 1 illustrates a known sensor evaluation system.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

FIG. 1 shows a known sensor evaluation system for autonomous vehicle driving. An autonomous vehicle relies upon a number of sensors to make driving decisions. Very often, many of the same type of sensor will be used at different points within the vehicle, or the sensors will be grouped redundantly. Sensors of a same or similar type may be categorized into a sensor group. In FIG. 1, five sensor groups 101, 102, 103, 104, and 105, are depicted. The number of sensor groups may be larger or smaller than five in a given vehicle, and the number of sensor groups chosen for FIG. 1 is selected for demonstrative purposes only, and should not be understood to be limiting. In this figure, each sensor group includes three sensors of the same type, such that sensor group 101 includes a first sensor 101*a*, a second sensor 101*b*, and a third sensor 101*c*; sensor group 102 includes a first sensor 102*a*, a second sensor 102*b*, and a third sensor 102*c*, and so on. Each sensor gathers raw data according to the nature of the sensor, whether image data, radar data, lidar data, or otherwise. An autonomous vehicle may include, without limitation, image sensors such as standard cameras, surround cameras, and or depth cameras; radar; lidar; microphones; temperature sensors; moisture or humidity sensors; gyroscopes; and/or a multitude of other sensor types. A specific list of all possible sensor types exceed the scope of the disclosure and therefore will not be included herein. A person skilled in the art will appreciate the variety of sensor types available for an autonomous driving vehicle.

Each sensor gathers raw data and transfers the data to a respective frontend unit for each sensor group. That is, each sensor in the first sensor group 101 transmits its data to a first sensor group frontend 106. Each sensor in the second sensor group 102 transmits its data to a second sensor group frontend 107, and so on with sensor group frontends 108, 109, and 110. In the conventional model, each sensor group frontend performs a variety of processing steps on the sensor data, including, but not limited to, synthesizing the data from the plurality of sensors into a single data stream, and condensing the data. It is known for each sensor frontend to condense the data by summarizing the data, which yields a smaller data stream. Once summarized, the data streams of each frontend are transmitted into a fusion unit 111. The fusion unit 111 receives data streams from each of the data frontends 106-110, where each frontend data stream is fused into a single data stream. In this conventional model, data from one sensor type is first combined with, or compared to, data from a second sensor type within the fusion unit 111. The fusion unit uses one or more predefined rules to fuse the information from the various frontends together. This may be based on one or more algorithms, including algorithms related to up sampling or down sampling, decision-making, priority, or otherwise.

The fusion unit 111 may perform various data processing functions, including interpolation or extrapolation of data, based on a sampling rate. That is, sensors may receive data at different sample rates. Because the data is then received at different frequencies, interpolation or extraction calculations are performed in order to estimate the data results among the various frontends at a unified frequency, even where data for a given sensor group is not recorded within the unified frequency. Once the data is appropriately interpolated or extracted, the data is homogenized into a single data stream within the fusion unit 111, where it is transferred to an incident detection unit 112 and an autonomous driving unit 113. The incident detection unit 112 examines the homogenized data stream and determines the likelihood of a collision or other untoward event. The resulting data are transmitted into the autonomous driving unit 113. The autonomous driving unit 113 makes driving decisions based on the received data.

Figure 2:
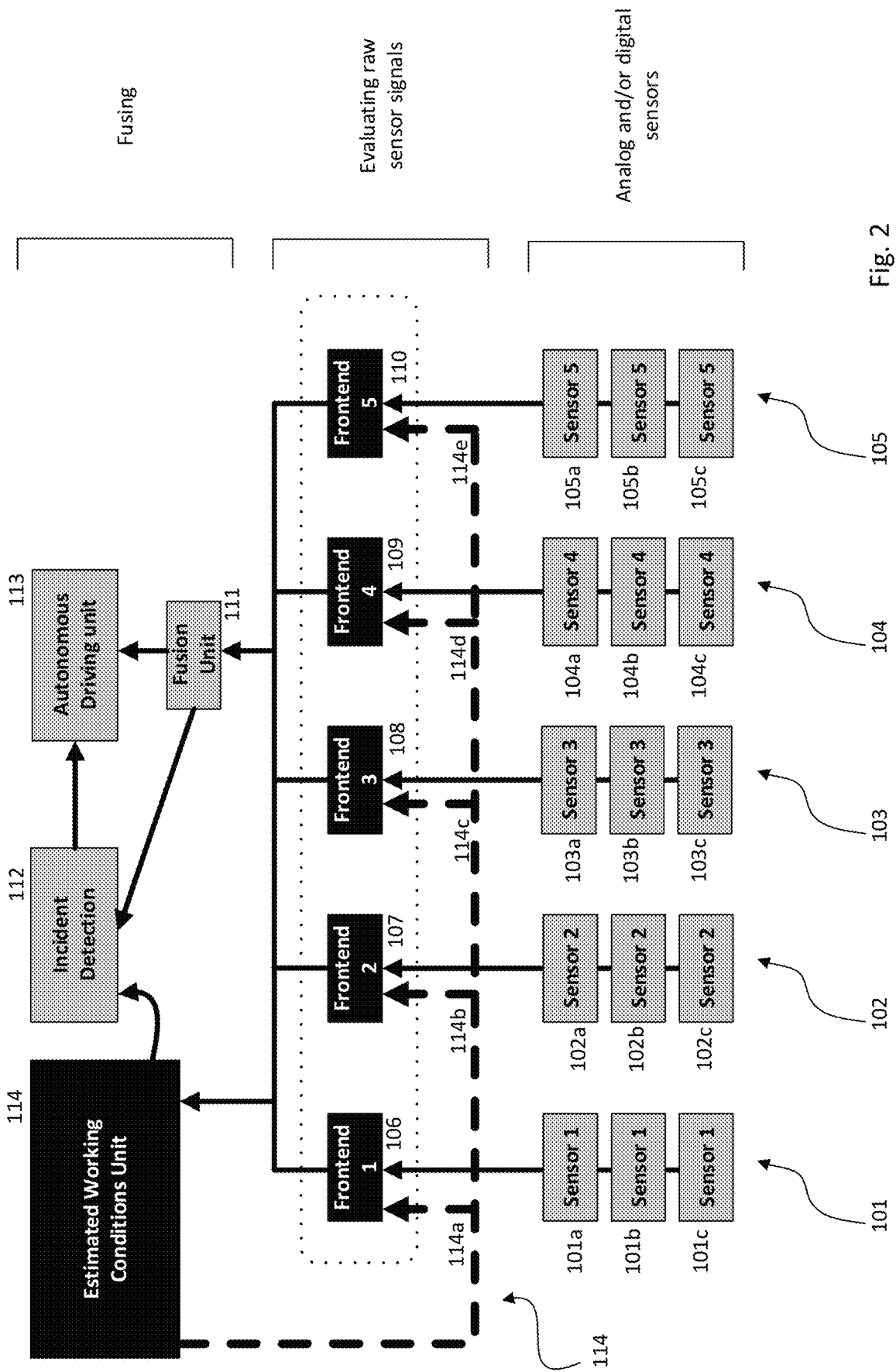
FIG. 2 shows a context-aware evaluation system according to an aspect of the Disclosure.

FIG. 2 shows a context-aware evaluation system according to an aspect of the disclosure. As in FIG. 1, the context-aware system shows five sensor groups 101-105, each sensor group comprising three sensors, displayed as 101*a*, 101*b*, and 101*c* for the first sensor group, and 102*a*, 102*b*, and 102*c*, for the second sensor group, and so on. Each sensor group has a corresponding sensor frontend, depicted as 106-110, to which each sensor of a sensor group sends its raw sensor information. The frontends gather the raw sensor information and perform a variety of processing activities therewith. Said processing may include, but is not limited to, combining data, and filtering out unnecessary data or corrupt data. Of note, although the frontends may otherwise process the sensor data as described herein, the frontends will not normally summarize the data as in the conventional model. Each frontend 106-110 outputs a frontend output signal to the fusion unit 111. The fusion unit performs any necessary interpolation and or extrapolation calculations and homogenizes the frontend outputs into a unified data stream. The fusion unit 111 outputs the unified data stream into the incident detection unit 112 and the autonomous driving unit 113. Where the incident detection unit detects a likelihood of an untoward incident, this likelihood is reported from the incident detection unit 112 to the autonomous driving unit 113.

In FIG. 2, the frontends 106-110 also output to an estimated working conditions unit 114, which collects the signals from each of the frontend outputs. The estimated working conditions unit 114 routes the frontend output signals to the input of each of the five frontend units 106-110, as shown in FIG. 2, wherein the frontend outputs are delivered as 114a to frontend one 106, as 114b to frontend two 107, as 114c to frontend three 108, as 114c to frontend four 109, and to 114e to frontend five 110. With this configuration, each frontend unit constructively receives the output of each other frontend unit, the received output being either identical to the frontend output or being substantially similar to the frontend output, said differences being generally limited to any processing by the estimated working conditions unit as described herein.

Thus, data from multiple sensor types is now first available within the data frontend, rather than in the fusion unit 111. As will be described in greater detail, each frontend unit is configured to evaluate the data received from its corresponding sensors based on data received from the outputs of one or more other frontend units. That is to say, and because of the combined frontend output data received from the estimated working conditions unit 114, frontend one 106, for example, can interpret its data received from its sensors 101a, 101b, and/or 101c, using data received from at least one of frontend two 107, frontend three 108, frontend four 109, or frontend five 110.

Figure 3:
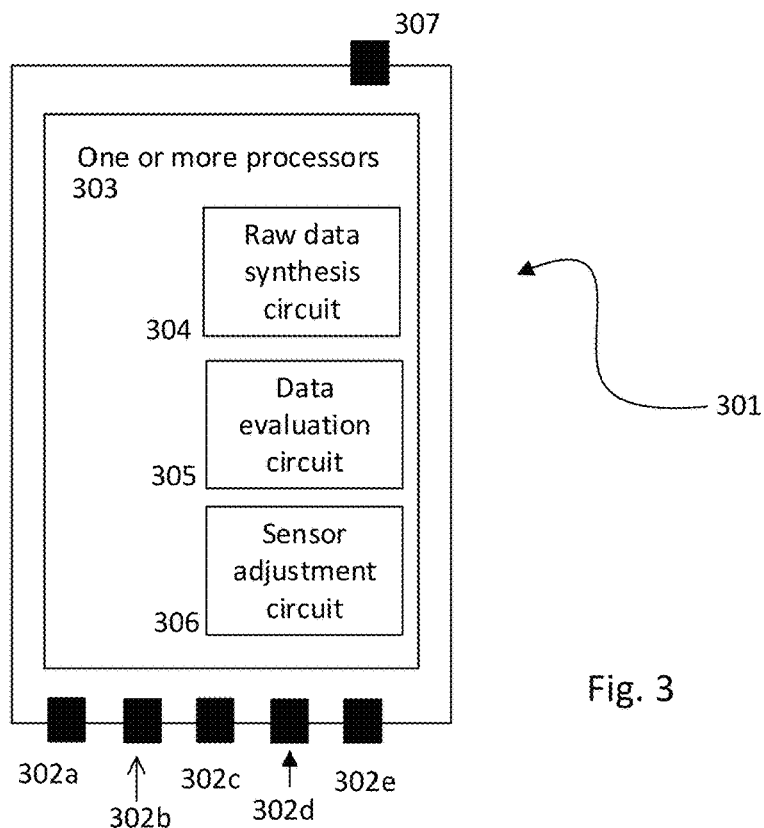
FIG. 3 shows a sensor frontend according to an aspect of the disclosure.

FIG. 3 shows a sensor frontend 301, according to one aspect of the disclosure. The sensor frontend 301 includes a plurality of sensor inputs 302 (in this example, five sensor inputs are depicted 302a, 302b, 302c, 302d, and 302e). The sensor frontend 301 is operated by one or more processors 303, which perform a variety of calculations on the received sensor data. The one or more processors may include a raw data synthesis circuit 304, configured to combine data from a plurality of sensors into a single data stream; a data evaluation circuit 305, configured to evaluate received sensor data and/or evaluate one or more data streams from other frontends; and a sensor adjustment circuit 306, configured to perform one or more setting adjustments based at least on the data evaluation. The sensor frontend 301 may also include a frontend output 307, configured to deliver from the sensor frontend a sensor data stream, which is transmitted to the fusion unit 111 and the estimated working conditions unit 114.

Figure 4:
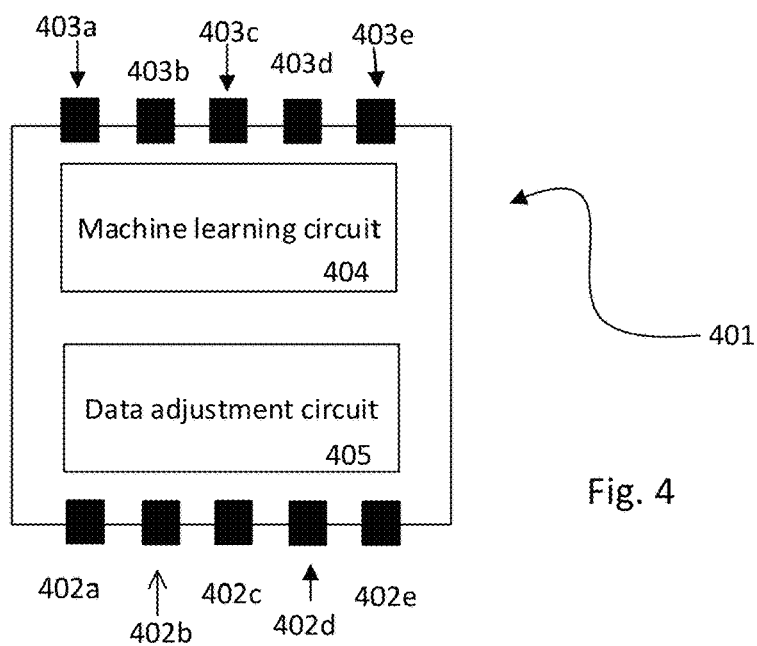
FIG. 4 shows an Estimated Working Conditions Unit.

FIG. 4 shows an estimated working conditions unit 401 according to an aspect of the disclosure. This estimated working conditions unit 401 includes one or more inputs to receive frontend data, which are depicted in FIG. 4 as elements 402a, 402b, 402c, 402d, and 402e. The number of inputs within the estimated working conditions unit 401 may vary depending on the frontend data delivery configuration. That is, there may be a single frontend input configured to receive data from each frontend, or the estimated working conditions unit 401 may be configured with multiple inputs. The number of inputs should not be understood to be restrictive. The estimated working conditions unit 401 is further configured with one or more outputs, herein depicted as 403a, 403b, 403c, 403d, and 403e. The one or more outputs are configured to deliver received frontend data to each of the sensor frontends. The estimated working conditions unit 401 is further configured with a machine learning circuit 404, which is configured to perform one or more machine learning algorithms and/or logical processes to learn at least from conclusions reached based on comparisons of data from a plurality of sensors to data from a different frontend. The estimated working conditions unit 401 may further include a data adjustment circuit 405, which is configured to perform adjustments on received data, as needed, to allow said received data to be understood or interpreted by one or more other frontend devices. This may be relevant, for example, where a data format issued by one sensor and/or frontend is unreadable by a different frontend without conversion. The data adjustment circuit 405 is configured to perform any such necessary conversion such that data from one frontend can be read and interpreted by a different frontend.

Figure 5:
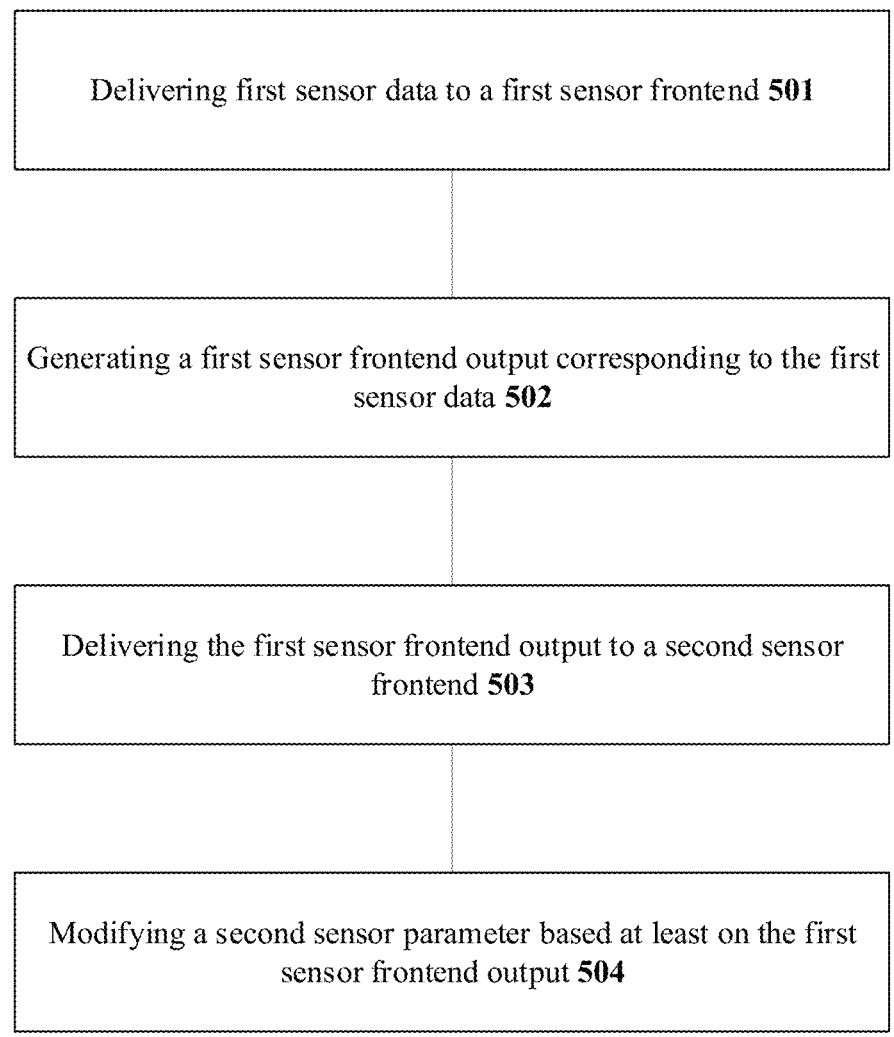
FIG. 5 shows a method of sensor data evaluation.

FIG. 5 shows a method of sensor data evaluation comprising delivering first sensor data to a first sensor frontend 501; generating a first sensor frontend output corresponding to the first sensor data 502; delivering the first sensor frontend output to a second sensor frontend 503; and modifying a second sensor parameter based at least on the first sensor frontend output 504.

The context aware evaluation system as described herein may be a system for autonomous vehicle operation. The system may be located within an autonomous vehicle and may rely on a variety of sensors throughout the autonomous vehicle, which are equipped to obtain data about various functions of the vehicle and or the vehicle's surroundings. The context aware evaluation system may be located anywhere within the vehicle. The context aware evaluation system may be further equipped with a transceiver, configured to connect with a base station, an external server, one or more other vehicles, a roadway system, or otherwise, to obtain information related to autonomous vehicle function. The system may use any method of wireless communication including, but not limited to LTE, 5G, Bluetooth, WLAN, V2V, or otherwise.

Multiple sensors may be used throughout the vehicle, and sensor data from multiple sensors may be combined into a single frontend. Conventionally, a frontend may be configured to receive sensor data from one or more sensors of a like kind, such as one or more depth camera sensors, one or more radar sensors, or one or more lidar sensors. The sensor data from the one or more sensors of like kind are delivered to the frontend, which may be configured to combine the plurality of data streams into a single sensor stream. That is, a frontend may receive data from a plurality of sensors, combine that data into a single stream, and transmit a single stream of combined sensor data to at least a fusion unit and an estimated working conditions unit.

In addition to combining data from a plurality of sensors, the frontend may be configured to compress the received data, or otherwise reduce the size of its data output, such as by deleting unnecessary data. Although the specifics of this performance may be left to a given implementation, the frontend may be configured to identify duplicative data within a plurality of sensors, and to merge the sensor data such that the duplicative data is present only once. This may reduce the size of the frontend output and thus simplify subsequent computation. The frontend may be programmed to identify data that is unnecessary for analysis by the other components within the system, such as the fusion unit, the autonomous driving unit, the incident detection unit, the estimated working conditions unit, or other frontends. The identification of duplicative or unnecessary information may be performed by one or more algorithms, which are configured to identify such information within the data stream input from the plurality of sensors, and to condense or delete such information is necessary.

According to one aspect of the disclosure, the frontend may be configured to employ one or more algorithms to identify data from a malfunctioning sensor within the plurality of input sensors. In a vehicle configuration, it may occur that a plurality of sensors are duplicative, such that they are configured to provide constructively identical data information. Where there is a data conflict between two sensors that are intended to be duplicative, there is a likelihood that one of the sensors may be malfunctioning. Even where sensors are not intended to be duplicative, they may be expected to provide sensor data within a range of similarity. For example, where image sensors are mounted to a variety of positions and locations on a vehicle, the image sensors may be expected to receive differing data reflecting a variety of angles or perspectives; however, where the weather includes, for example, heavy precipitation, it may be expected that each image sensor would reveal the heavy precipitation, and a single image sensor not revealing the heavy precipitation may be evaluated for malfunction. Thus, sensors expected to provide similar sensor data may be evaluated for sensor malfunction, and a sensor malfunction may be suspected or identified where a sensor produces incongruous data.

The frontend may be configured to eliminate, omit, or delete information that is unuseful or unnecessary for subsequent frontends to perform data comparison. Output data from a frontend is routed to a plurality of additional frontends via the estimated working conditions unit. In providing data from one frontend to a different frontend, the receiving frontend is able to contextually evaluate its sensor data by comparing that data with data received from one or more additional frontends. It may be determined in installation that a particular type of data may be unuseful or unnecessary for such data comparisons among frontend units. Such data may be deleted or removed, such that it is not transmitted to the estimated working conditions unit or subsequent frontends, thereby simplifying the data transmission and eliminating unused or unusable sensor data.

A frontend may be configured to determine a reliability factor of one or more sensors. A reliability factor may be determined in at least two ways. First, as described above, sensor data received by a corresponding frontend may be evaluated for reliability where two or more sensors are duplicative or expected to return similar sensor information. Where the data from such sensors is identical or similar, there may be a higher resulting reliability factor. Where the data for such sensors is dissimilar, there may be a resulting low reliability factor. The magnitude of the reliability factor may correspond with the magnitude of similarity. Second, a reliability factor may be determined based on a comparison of the input sensor data with data from at least one other frontend. This can be performed based on one or more algorithms, including but not limited to, machine learning algorithms, such that data from another frontend provides a context to understand data from a sensor input.

As an example, it may be possible to contextually interpret received lidar data based on image sensor data. Although lidar may provide useful 360 degree, three-dimensional information during many circumstances, lidar is known to provide sub-optimal data in rainy conditions, owing at least to its reliance on light for its mapping function. A lidar sensor may detect raindrops as falling objects, which may trigger a collision avoidance mechanism. Nevertheless, other sensors may be able to detect rain without the same danger. For example, rain may be determined based on, for example, an image sensor, which may capture images of precipitation. Rain may form identifiable patterns in images captured by an image sensor, such that a determination of rain can be made from image sensor data. Furthermore, a sensor could be connected to the vehicle's windshield wiper mechanism, such that engaging the windshield wipers may be interpreted as an indication of rain. Where rain is detected, through whatever mechanism, data received from one or more lidar sensors may be interpreted with the knowledge that a detrimental factor, in this case rain, is known to exist, and its data may be interpreted accordingly. Where rain is present, the lidar data may be subject to additional scrutiny; it may be discounted altogether; it may be subject to additional tests; or it may be adjusted to refine or improve the resulting data, etc. For example, where a lidar frontend detects rain based on image sensor data or windshield wiper data, the frontend may change a lidar resolution so that raindrops are no longer detected, or are no longer considered a hazard. The opposite action may also be performed, wherein a detection via, for example, a camera sensor or a windshield wiper sensor, that the rain has ceased may trigger the lidar frontend to adjust the lidar resolution to the pre-rain levels.

A working condition is used herein to describe a functional quality of a sensor. This may include at least a normal functioning state, an impaired functioning state, or a malfunctioning state. An impaired functioning state is a state in which a sensor is unable to provide data with a sufficient reliability. This may be due to sensor parameters, such as resolution, gain, etc., or due to external factors, such as weather. Each frontend can calculate a working condition of its own sensors. The estimated working condition unit may further calculate a working condition of any of the sensors within any of the frontends.

According to another aspect of the disclosure, one or more frontends may be configured to output raw sensor data. The raw sensor data may be in substantially the same form as it is transmitted from the corresponding sensor. The raw data may be transmitted in separate data streams, such that the sensor data is not combined but rather maintains its original raw data structure in separate data streams.

According to another aspect of the disclosure, the raw data may be data from a plurality of sensors may be merged together into a single data stream. This data may be referred to as synthesized data, wherein a plurality of data streams of raw data are synthesized together into a single data stream.

The frontend may include one or more processors configured to evaluate a reliability of its data based on one or more algorithms. This may be performed independently of other data streams, such that the frontend is capable of evaluating a reliability of its own sensor data even where data from other frontends are not received or not considered. Reliability of such sensor data may be evaluated based on any suitable algorithm, including, but not limited to, evaluating the sensor data based on anticipated similarity of sensor data from redundant sensors or sensors that are otherwise likely to provide substantially similar sensor data.

The one or more processors of a frontend unit may be configured to derive a condition context from data from a different frontend unit. The condition context may be a condition that diminishes a function of the one or more sensors. Using the prior example wherein a lidar sensor is known to be impaired in situations of rain, sensor data from a different frontend that indicates the presence of rain (such as an image sensor or windshield wiper sensor) may suggest impairment of data from a lidar sensor. The condition context in this example is an algorithm that calls for additional scrutiny or modification of lidar data, where other sensor data suggests rain. Other such examples, for demonstrative purposes, include a first sensor that indicates a time during daylight hours, and an image sensor that suggests darkness despite the necessary presence of the sun. In this scenario, the indication of a time during daylight hours is a condition context, and this condition context suggests that an image sensor showing darkness may be malfunctioning. The condition contexts may be predetermined contexts that are programmed for a given implementation. They may also be machine-learned relationship based at least on prior sensor data.

Based on the condition context evaluation, the frontend may be configured to modify one or more parameters within one or more of the frontends sensors. Depending on the type of sensor used, the sensor may be capable of performing under a variety of different adjustable parameters, which may alter sensor processing or output. For example, an image sensor may be capable of receiving and/or processing image information at a variety of resolutions, frame rates, ISOs, or otherwise. Such parameters are not unique to image sensors. A radar sensor, for example may be capable of performing at a variety of beam gains, transmission intervals, resting intervals, and directions. The frontend may be configured to adjust one or more parameters based on the condition context evaluation results, said parameters corresponding to the function of the particular sensor or type of sensor associated with the frontend. For example, where a lidar sensor is impaired by rain, the frontend may identify rain based on evaluation of other sensor data. The frontend may then adjust a parameter of the lidar, such as the resolution, to improve the lidar results. Parameters associated with the sensor may include, but are not limited to, sensor data resolution, sensor sampling rate, and/or sensor sensitivity.

As described above, the condition context may help identify a factor (such as rain in the above example), which causes an impairment of a group of sensors (such as the lidar sensors functioning poorly in rainy conditions). The condition context may also identify one or more malfunctioning sensors within a larger group of sensors. In this case, a comparison of sensor data with data from a different frontend may suggest that a first subset of the sensors are functioning in an expected manner and a second subset of the sensors are functioning in an unexpected manner. In such a situation, the first subset of the sensors operating in the expected manner may be functioning properly. The second subset of sensors operating in an unexpected manner may be malfunctioning. For example, where a frontend for a plurality of lidar sensors determines that a first subset of the lidar sensors provides data tending to suggest a blanket of small falling objects (such as in a rainstorm), and a second subset of lidar sensors provides data suggesting no falling objects, there is a conflict between the data provided by two lidar sensors, which one would expect to be substantially similar. This can be compared to data from another sensor, such as an image sensor. Where the image sensor indicates the presence of rain, this may suggest that the first subset of lidar sensors is functioning properly and the second subset of lidar sensors is malfunctioning. Thus, further action can be taken to rectify, repair, or disable the malfunctioning sensor. This ability to identify a malfunctioning sensor is not limited to the combination of lidar and image sensors, but may be performed by a variety of sensor combinations as configured according to the implementation, or as determined by a machine learning process.

Where a malfunctioning sensor is identified, the frontend may be configured to disable the malfunctioning sensor. Particularly where a plurality of similar sensors are available, disabling the malfunctioning sensor may increase overall quality of data, and may provide the autonomous driving unit with a higher quality of information with which to make autonomous driving decisions.

The condition context evaluation process may be performed in an iterative series of steps to refine the resulting information. As previously described, a sensor frontend may evaluate its sensor data relative to data received from another frontend. Such an evaluation may invoke a condition context, which provides information about the quality of sensor information produced, or potentially about a subset of the sensors which may be malfunctioning. As described herein, the frontend may be configured to adjust one or more sensor parameters to improve sensor data according to the condition context, or to disable one or more sensors which appear to be malfunctioning. After such parameter modification or disabling is performed, it is anticipated that the sensor data output is modified by virtue of the parameter change or disablement. The frontend may be configured to then evaluate the modified sensor output in light of sensor data from a different frontend. Thus, sensor data from an external frontend may be used to perform a series of evaluative steps. The second or subsequent evaluative step may be used to determine the effectiveness of a modification or disablement of the sensor. That is, where the frontend modifies a parameter or disables a putatively malfunctioning sensor, a subsequent evaluation of sensor data in light of data from a second frontend may indicate whether the modification or disablement resulted in an improvement or detriment to the data. Where an improvement was made, the parameter modification or disablement may be retained. Where the data appears to be detrimented, the parameter modification or disablement may be reversed.

The one or more processors within the frontend may be configured to implement a machine learning algorithm relative to a parameter modification or a sensor disablement. That is, where it is hypothesized based on a comparison between sensor data from a first frontend and sensor data from a second frontend that one or more sensors are impaired, and where based on this hypothesis a parameter modification or sensor disablement is performed, and wherein it is determined that the parameter modification or sensor disablement resulted in improved data, the one or more processors within the frontend may be configured to learn the modification based on a machine learning process. Once learned, the one or more processors may be configured to perform such modification or disablement upon recognizing a similar pattern within its own sensor data. Machine learning may include learning to recognize data patterns from one or more sensors. For example, where it was determined from a windshield wiper sensor and a camera sensor that it is raining, the data from the lidar sensor can be assessed to see a pattern associated with rain. In doing so, when that pattern is seen in the future, the system can recognize raining from that lidar pattern and thereby save the analysis of correlating that pattern with the various other sensor data.

Once sensor data is received and processed by a frontend, that frontend transmits the data into the estimated working conditions unit. The estimated working conditions unit is configured to receive data from each of the frontends, and transmit this received frontend data to each of the frontends. The result is that each frontend receives data from each of the other frontends. This provides each frontend with the ability to make context-driven decisions regarding its own sensor data by using data from one or more of the other frontends. In a conventional implementation, and even where context-driven sensor adjustments or driving decisions are made, the improvement or associations related to the improvement are lost for future use. In the conventional implementation, frontend data is first combined in the fusion unit, which does not store associations for learning and future use. That is, improvements and related associations are lost in the fusion unit. However, as described herein, information about the improvement is routed to the estimated working conditions unit, where a machine learning process takes place to learn from the improvement and be able to use it in the future.

Pursuant to the modification strategies described above, each frontend may be configured to deliver to the estimated working conditions unit a first modified frontend output according to a modified parameter of the one or more first sensors. That is, a frontend may modify one or more of its sensors in order to improve the quality of sensor data. The modified sensor data is then transmitted to the estimated working conditions unit, which subsequently transmits the modified sensor data to one or more additional frontend units. Thus, a frontend is configured to modify sensors based at least on other frontend data, and that modified sensor data is transmitted to the other frontends for comparison to their own sensor data. Using the system, a frontend unit may modify its sensor data based on a comparison to modified data from a different frontend. Using this model, and iterative refinement system is created, such that sensor data can be continuously refined and improved.

The estimated working conditions unit may further include one or more machine learning processors configured to carry out an algorithm according to the condition context. Machine learning within the estimated working conditions unit may take place for the purpose of at least autonomous driving, wherein condition contexts and/or sensor modification data is received and learned by the estimated working conditions unit, and related decisions are transferred to the autonomous driving unit. The estimated working conditions unit may include a machine learning circuit, configured to learn associations between sensor data from different sensor types. Such machine learning may originate in the estimated working conditions unit, and/or such machine learning may include any machine learning that originates in any of the frontend units. That is, where a frontend interprets and/or adjusts its sensor data based at least in part on data from another frontend, learning has occurred, and this learned association may be included within the estimated working conditions unit. Learned associations within the estimated working conditions unit may be provided to frontends for future data assessments; applied within the estimated working conditions unit relative to present or future frontend data; and/or used to transmit conclusions to the incident detection unit.

The machine learning both in the frontend and the estimated working conditions unit is aided by the use of raw or nearly raw data. In a conventional implementation, data is first aggregated from multiple kinds of sensors in the fusion unit; however, the fusion unit only receives data summaries. Said summaries lack the robust data required for substantial machine learning, and to the extent that machine learning is possible with data summaries, it is diminished compared to the machine learning possible with raw or nearly raw data. Thus, the ability to combine raw or nearly raw data in the frontend and/or the estimated working conditions unit allows for a more robust machine learning relative to the conventional system.

The estimated working conditions unit may be configured to determine whether sufficient sensor information is available to perform an autonomous driving operation. Because at least of the safety issues involved, autonomous driving requires at least a threshold of reliable sensory data such that reasonably safe driving decisions can be made. The estimated working conditions unit may be configured to evaluate the reliability of its received sensor data and to determine from that evaluation whether sufficient sensory data is available to complete a driving operation. Where sufficient information is available, the requisite information is allowed to pass into the autonomous driving unit. Where insufficient reliable information is present, the estimated working conditions unit may determine that an autonomous driving operation may not be possible. Under this circumstance, the estimated working conditions unit may be configured to instruct a human driver to assume driving responsibility and/or to cause an autonomous driver to cause the motor vehicle to stop.

The estimated working conditions unit may be configured to perform various processing operations on the received frontend output. One or more frontends may be unable to process data output from one or more other frontends. Thus, in order to provide each frontend with data from the other frontends, the estimated working conditions unit may be required to perform various processing operations in order to make data from one frontend readable or accessible to a different frontend. The estimated working conditions unit may be configured to perform these processing operations in accordance with a given implementation. Such processing operations include, but are not limited to, sampling rate modifications, frequency modifications, resolution modifications, or otherwise. The connection within the estimated working condition unit to all of the sensors allows for the real time comparison of sensor information without aligning the sensor data according to update ratios.

The principles described herein may be used with any type of sensor, without limitation. It is anticipated that an autonomous driving vehicle may rely on a plurality of sensors to make autonomous driving decisions. Such sensors may include image sensors such as, but not limited to, stereo image sensors, mono image sensors, raw image sensors and/or depth camera sensors.

An autonomous vehicle may further use additional sensors, without limitation, such as radar sensors, lidar sensors, temperature sensors, moisture sensors, rotational sensors, velocity sensors, acceleration sensors, gyroscope sensors, global positioning system sensors, or any other sensor selected for an autonomous driving task.

The following examples pertain to various aspects of the disclosure as described herein:

In Example 1, a sensor data evaluation system is disclosed comprising one or more first sensors, configured to deliver first sensor data to a first sensor frontend; the first sensor frontend, configured to generate a first sensor frontend output corresponding to the first sensor data and to deliver the first sensor frontend output to a second sensor frontend; and the second sensor frontend, configured to receive second sensor data from one or more second sensors; and modify a second sensor parameter based at least on the first sensor frontend output.

In Example 2, the sensor data evaluation system of Example 1 is disclosed, wherein the sensor data evaluation system is a system for autonomous vehicle operation.

In Example 3, the sensor data evaluation system of Example 1 or 2 is disclosed, wherein the first sensor frontend comprises one or more processors, configured to combine the first sensor data from the one or more first sensors into a first sensor frontend output.

In Example 4, the sensor data evaluation system of any one of Examples 1 to 3 is disclosed, wherein the first sensor frontend comprises one or more processors, configured to generate a first sensor frontend output according to an algorithm.

In Example 5, the sensor data evaluation system of Example 4 is disclosed, wherein the algorithm is configured to identify and omit duplicative data.

In Example 6, the sensor data evaluation system of any one of Examples 4 to 5 is disclosed, wherein the one or more processors of the first sensor frontend are configured to identify and omit data that is unnecessary for the second sensor frontend to evaluate the second sensor data.

In Example 7, the sensor data evaluation system of any one of Examples 4 to 6 is disclosed, wherein the one or more processors of the first sensor frontend are configured to synthesize the first sensor data.

In Example 8, the sensor data evaluation system of any one of Examples 1 to 7 is disclosed, wherein the first sensor frontend output is raw data.

In Example 9, the sensor data evaluation system of any one of Examples 1 to 7 is disclosed, wherein the first sensor frontend output is synthesized data corresponding to raw data from the one or more first sensors.

In Example 10, the sensor data evaluation system of any one of Examples 1 to 9 is disclosed, wherein the one or more processors of the second sensor frontend are further configured to determine a working condition of at least one of the one or more second sensors based at least on the first sensor frontend output.

In Example 11, the sensor data evaluation system of Example 10 is disclosed, wherein the working condition is an impairment of a second sensor or a malfunctioning of a second sensor.

In Example 12, the sensor data evaluation system of any one of Examples 1 to 11 is disclosed, wherein the one or more processors of the second sensor frontend are further configured to derive a condition context from at least the first sensor frontend output.

In Example 13, the sensor data evaluation system of Example 12 is disclosed, wherein the condition context is a condition that diminishes a function of the one or more second sensors.

In Example 14, the sensor data evaluation system of any one of Example 12 or 13 is disclosed, wherein the one or more processors of the second sensor frontend are further configured to evaluate the second sensor data according to the condition context.

In Example 15, the sensor data evaluation system of any one of Examples 12 to 14 is disclosed, wherein the one or more processors of the second sensor frontend are further configured to modify the second sensor parameter according to the condition context.

In Example 16, the sensor data evaluation system of any one of Examples 1 to 15 is disclosed, wherein the second sensor parameter is a sensor data resolution.

In Example 17, the sensor data evaluation system of any one of Examples 1 to 15 is disclosed, wherein the second sensor parameter is a sensor sampling rate.

In Example 18, the sensor data evaluation system of any one of Examples 1 to 15 is disclosed, wherein the second sensor parameter is a sensor sensitivity.

In Example 19, the sensor data evaluation system of any one of Examples 1 to 18 is disclosed, wherein the one or more processors of the second sensor frontend are further configured to evaluate the modified second sensor data based on at least the first sensor frontend output.

In Example 20, the sensor data evaluation system of Example 19 is disclosed, wherein the one or more processors of the second sensor frontend are further configured to execute a machine-learning algorithm based on an evaluation of the first sensor frontend output and the second sensor data.

In Example 21, the sensor data evaluation system of any one of Examples 1 to 20 is disclosed, further comprising an estimated working conditions unit, configured to receive the first sensor frontend output from the first sensor frontend and to direct the first sensor frontend output to the second sensor frontend.

In Example 22, the sensor data evaluation system of Example 21 is disclosed, wherein the estimated working conditions unit further comprises one or more machine learning processors, configured to carry out a machine learning algorithm.

In Example 23, the sensor data evaluation system of Example 21 or 22 is disclosed, wherein the estimated working conditions unit associates a condition context with the modification to the second sensor parameter.

In Example 24, the sensor data evaluation system of Example 21 to 23 is disclosed, wherein the estimated working conditions unit further comprises one or more processors, configured to convert the first sensor frontend output to a format processable by the second sensor frontend.

In Example 25, the sensor data evaluation system of any one of Examples 1 to 24 is disclosed, wherein the one or more first sensors are a single sensor type.

In Example 26, the sensor data evaluation system of any one of Examples 1 to 25 is disclosed, wherein the one or more second sensors are a single sensor type different from the one or more first sensors.

In Example 27, the sensor data evaluation system of any one of Examples 1 to 26 is disclosed, wherein the one or more first sensors are any one of stereo image sensors, raw image sensors, or depth camera sensors.

In Example 28, the sensor data evaluation system of any one of Examples 1 to 26 is disclosed, wherein the one or more first sensors are any one of radar sensors or lidar sensors.

In Example 29, the sensor data evaluation system of any one of Examples 1 to 28 is disclosed, wherein the one or more second sensors are any one of stereo image sensors, raw image sensors, or depth camera sensors.

In Example 30, the sensor data evaluation system of any one of Examples 1 to 28 is disclosed, wherein the one or more second sensors are any one of radar sensors or lidar sensors.

In Example 31, the sensor data evaluation system of any one of Examples 1 to 30 is disclosed, wherein the one or more first sensors are sensors for use in an autonomous vehicle.

In Example 32, a method of sensor data evaluation is disclosed comprising delivering first sensor data to a first sensor frontend; generating a first sensor frontend output corresponding to the first sensor data; delivering the first sensor frontend output to a second sensor frontend; and modifying a second sensor parameter based at least on the first sensor frontend output.

In Example 33, the method of sensor data evaluation of Example 32 is disclosed, wherein the method of sensor data evaluation is a method for autonomous vehicle operation.

In Example 34, the method of sensor data evaluation of Example 32 or 33 is disclosed, wherein the first sensor frontend combines the first sensor data from the one or more first sensors into a first sensor frontend output.

In Example 35, the method of sensor data evaluation of any one of Examples 32 to 34 is disclosed, wherein the first sensor frontend generates a first sensor frontend output according to an algorithm.

In Example 36, the method of sensor data evaluation of Example 35 is disclosed, wherein the algorithm is configured to identifies and omits duplicative data.

In Example 37, the method of sensor data evaluation of any one of Examples 35 to 36 is disclosed, further comprising identifying and omitting data that is unnecessary for the second sensor frontend to evaluate the second sensor data.

In Example 38, the method of sensor data evaluation of any one of Examples 35 to 37 is disclosed, further comprising synthesizing the first sensor data.

In Example 39, the method of sensor data evaluation of any one of Examples 32 to 38 is disclosed, wherein the first sensor frontend outputs raw data.

In Example 40, the method of sensor data evaluation of any one of Examples 32 to 38 is disclosed, wherein the first sensor frontend outputs synthesized data corresponding to raw data from the one or more first sensors.

In Example 41, the method of sensor data evaluation of any one of Examples 32 to 40 is disclosed, further comprising determining a working condition of at least one of the one or more second sensors based at least on the first sensor frontend output.

In Example 42, the method of sensor data evaluation of Example 41 is disclosed, wherein the working condition is an impairment of a second sensor or a malfunctioning of a second sensor.

In Example 43, the method of sensor data evaluation of any one of Examples 32 to 42 is disclosed, further comprising deriving a condition context from at least a first sensor frontend output.

In Example 44, the method of sensor data evaluation of Example 43 is disclosed, wherein the condition context is a condition that diminishes a function of one or more second sensors.

In Example 45, the method of sensor data evaluation of any one of Example 43 or 44 is disclosed, further comprising evaluating the second sensor data according to the condition context.

In Example 46, the method of sensor data evaluation of any one of Examples 43 to 45 is disclosed, further comprising modifying the second sensor parameter according to the condition context.

In Example 47, the method of sensor data evaluation of any one of Examples 32 to 46 is disclosed, wherein the second sensor parameter is a sensor data resolution.

In Example 48, the method of sensor data evaluation of any one of Examples 32 to 46 is disclosed, wherein the second sensor parameter is a sensor sampling rate.

In Example 49, the method of sensor data evaluation of any one of Examples 32 to 46 is disclosed, wherein the second sensor parameter is a sensor sensitivity.

In Example 50, the method of sensor data evaluation of any one of Examples 32 to 49 is disclosed, further comprising evaluating the modified second sensor data based on at least the first sensor frontend output.

In Example 51, the method of sensor data evaluation of Example 50 is disclosed, further comprising executing a machine-learning algorithm based on an evaluation of the first sensor frontend output and the second sensor data.

In Example 52, the method of sensor data evaluation of any one of Examples 32 to 51 is disclosed, further comprising an estimated working conditions unit receiving the first sensor frontend output from the first sensor frontend and to direct the first sensor frontend output to the second sensor frontend.

In Example 53, the method of sensor data evaluation of Example 52 is disclosed, wherein the estimated working conditions unit is configured to carry out a machine learning algorithm.

In Example 54, the method of sensor data evaluation of Example 52 or 53 is disclosed, wherein the estimated working conditions unit associates a condition context with the modification to the second sensor parameter.

In Example 55, the method of sensor data evaluation of Example 52 to 54 is disclosed, wherein the estimated working conditions unit converts the first sensor frontend output to a format processable by the second sensor frontend.

In Example 56, the method of sensor data evaluation of any one of Examples 32 to 55 is disclosed, wherein the one or more first sensors are a single sensor type.

In Example 57, the method of sensor data evaluation of any one of Examples 32 to 56 is disclosed, wherein the one or more second sensors are a single sensor type different from the one or more first sensors.

In Example 58, the method of sensor data evaluation of any one of Examples 32 to 57 is disclosed, wherein the one or more first sensors are any one of stereo image sensors, raw image sensors, or depth camera sensors.

In Example 59, the method of sensor data evaluation of any one of Examples 32 to 57 is disclosed, wherein the one or more first sensors are any one of radar sensors or lidar sensors.

In Example 60, the method of sensor data evaluation of any one of Examples 32 to 59 is disclosed, wherein the one or more second sensors are any one of stereo image sensors, raw image sensors, or depth camera sensors.

In Example 61, the method of sensor data evaluation of any one of Examples 32 to 59 is disclosed, wherein the one or more second sensors are any one of radar sensors or lidar sensors.

In Example 62, the method of sensor data evaluation of any one of Examples 32 to 61 is disclosed, wherein the one or more first sensors are sensors for use in an autonomous vehicle.

In Example 63, a means for sensing means data evaluation is disclosed comprising one or more first sensing means, configured to deliver first sensing means data to a first sensing means frontend; the first sensing means frontend, configured to generate a first sensing means frontend output corresponding to the first sensing means data and to deliver the first sensing means frontend output to a second sensing means frontend; and the second sensing means frontend, configured to receive second sensing means data from one or more second sensing means; and modify a second sensing means parameter based at least on the first sensing means frontend output.

In Example 64, the means for sensor data evaluation of Example 63 is disclosed, wherein the means for sensor data evaluation is a system for autonomous vehicle operation.

In Example 65, the means for sensor data evaluation of Example 63 or 64 is disclosed, wherein the first sensing means frontend comprises one or more processing means, configured to combine the first sensing means data from the one or more first sensing means into a first sensing means frontend output.

In Example 66, the means for sensor data evaluation of any one of Examples 63 to 65 is disclosed, wherein the first sensing means frontend comprises one or more processing means, configured to generate a first sensing means frontend output according to an algorithm.

In Example 67, the means for sensor data evaluation of Example 66 is disclosed, wherein the algorithm is configured to identify and omit duplicative data.

In Example 68, the means for sensor data evaluation of any one of Examples 66 to 67 is disclosed, wherein the one or more processing means of the first sensing means frontend are configured to identify and omit data that is unnecessary for the second sensing means frontend to evaluate the second sensing means data.

In Example 69, the means for sensor data evaluation of any one of Examples 66 to 68 is disclosed, wherein the one or more processing means of the first sensing means frontend are configured to synthesize the first sensing means data.

In Example 70, the means for sensor data evaluation of any one of Examples 63 to 69 is disclosed, wherein the first sensing means frontend output is raw data.

In Example 71, the means for sensor data evaluation of any one of Examples 63 to 69 is disclosed, wherein the first sensing means frontend output is synthesized data corresponding to raw data from the one or more first sensing means.

In Example 72, the means for sensor data evaluation of any one of Examples 63 to 71 is disclosed, wherein the one or more processing means of the second sensing means frontend are further configured to determine a working condition of at least one of the one or more second sensing means based at least on the first sensing means frontend output.

In Example 73, the means for sensor data evaluation of Example 72 is disclosed, wherein the working condition is an impairment of a second sensing means or a malfunctioning of a second sensing means.

In Example 74, the means for sensor data evaluation of any one of Examples 63 to 73 is disclosed, wherein the one or more processing means of the second sensing means frontend are further configured to derive a condition context from at least the first sensing means frontend output.

In Example 75, the means for sensor data evaluation of Example 74 is disclosed, wherein the condition context is a condition that diminishes a function of the one or more second sensing means.

In Example 76, the means for sensor data evaluation of any one of Example 74 or 75 is disclosed, wherein the one or more processing means of the second sensing means frontend are further configured to evaluate the second sensing means data according to the condition context.

In Example 77, the means for sensor data evaluation of any one of Examples 74 to 76 is disclosed, wherein the one or more processing means of the second sensing means frontend are further configured to modify the second sensing means parameter according to the condition context.

In Example 78, the means for sensor data evaluation of any one of Examples 63 to 77 is disclosed, wherein the second sensing means parameter is a sensing means data resolution.

In Example 79, the means for sensor data evaluation of any one of Examples 63 to 77 is disclosed, wherein the second sensing means parameter is a sensing means sampling rate.

In Example 80, the means for sensor data evaluation of any one of Examples 63 to 77 is disclosed, wherein the second sensing means parameter is a sensing means sensitivity.

In Example 81, the means for sensor data evaluation of any one of Examples 63 to 80 is disclosed, wherein the one or more processing means of the second sensing means frontend are further configured to evaluate the modified second sensing means data based on at least the first sensing means frontend output.

In Example 82, the means for sensor data evaluation of Example 81 is disclosed, wherein the one or more processing means of the second sensing means frontend are further configured to execute a machine-learning algorithm based on an evaluation of the first sensing means frontend output and the second sensing means data.

In Example 83, the means for sensor data evaluation of any one of Examples 63 to 82 is disclosed, further comprising an estimated working conditions means, configured to receive the first sensing means frontend output from the first sensing means frontend and to direct the first sensing means frontend output to the second sensing means frontend.

In Example 84, the means for sensor data evaluation of Example 83 is disclosed, wherein the estimated working conditions means further comprises one or more machine learning processing means, configured to carry out a machine learning algorithm.

In Example 85, the means for sensor data evaluation of Example 83 or 84 is disclosed, wherein the estimated working conditions means associates a condition context with the modification to the second sensing means parameter.

In Example 86, the means for sensor data evaluation of Example 83 to 85 is disclosed, wherein the estimated working conditions means further comprises one or more processing means, configured to convert the first sensing means frontend output to a format processable by the second sensing means frontend.

In Example 87, the means for sensor data evaluation of any one of Examples 63 to 86 is disclosed, wherein the one or more first sensing means are a single sensing means type.

In Example 88, the means for sensor data evaluation of any one of Examples 63 to 87 is disclosed, wherein the one or more second sensing means are a single sensing means type different from the one or more first sensing means.

In Example 89, the means for sensor data evaluation of any one of Examples 63 to 88 is disclosed, wherein the one or more first sensing means are any one of stereo image sensing means, raw image sensing means, or depth camera sensing means.

In Example 90, the means for sensor data evaluation of any one of Examples 63 to 88 is disclosed, wherein the one or more first sensing means are any one of radar sensing means or lidar sensing means.

In Example 91, the means for sensor data evaluation of any one of Examples 63 to 90 is disclosed, wherein the one or more second sensing means are any one of stereo image sensing means, raw image sensing means, or depth camera sensing means.

In Example 92, the means for sensor data evaluation of any one of Examples 63 to 90 is disclosed, wherein the one or more second sensing means are any one of radar sensing means or lidar sensing means.

In Example 93, the means for sensor data evaluation of any one of Examples 63 to 92 is disclosed, wherein the one or more first sensing means are sensing means for use in an autonomous vehicle.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A sensor data evaluation system comprising:
    one or more first sensors, configured to deliver first sensor data to a first sensor frontend;
    the first sensor frontend, comprising one or more first processors, configured to generate a first sensor frontend output corresponding to the first sensor data and to deliver the first sensor frontend output to a second sensor frontend; and
    the second sensor frontend, comprising one or more second processors, configured to:
        receive second sensor data from one or more second sensors;
        derive a condition context from at least the first sensor frontend output, wherein the condition context is a condition that diminishes a function of the one or more second sensors; and
        send a signal to the one or more second sensors based at least on the condition context, the signal representing an instruction to modify a second sensor data resolution, a sensor sampling rate, or a second sensitivity of the one or more second sensors.

2. The sensor data evaluation system of claim 1, wherein the sensor data evaluation system is a system for autonomous vehicle operation.

3. The sensor data evaluation system of claim 1, wherein the first sensor frontend comprises one or more processors, configured to combine the first sensor data from the one or more first sensors into a first sensor frontend output.

4. The sensor data evaluation system of claim 3, wherein the one or more processors of the first sensor frontend are configured to identify and omit data that is unnecessary for the second sensor frontend to evaluate the second sensor data.

5. The sensor data evaluation system of claim 4, wherein the one or more processors of the first sensor frontend are further configured to synthesize the first sensor data.

6. The sensor data evaluation system of claim 1, wherein the second sensor frontend is further configured to determine a working condition of at least one of the one or more second sensors based at least on the first sensor frontend output.

7. The sensor data evaluation system of claim 6, wherein the working condition is an impairment of a second sensor or a malfunctioning of a second sensor.

8. The sensor data evaluation system of claim 1, wherein the second sensor frontend is further configured to evaluate the second sensor data according to the condition context.

9. The sensor data evaluation system of claim 6, wherein the second sensor frontend is further configured to modify the second sensor parameter according to the condition context.

10. The sensor data evaluation system of claim 1, wherein the second sensor parameter is a sensor data resolution.

11. The sensor data evaluation system of claim 1, wherein the second sensor parameter is a sensor sampling rate.

12. The sensor data evaluation system of claim 1, wherein the second sensor parameter is a sensor sensitivity.

13. The sensor data evaluation system of claim 1, wherein the second sensor frontend is further configured to evaluate the modified second sensor data based on at least the first sensor frontend output.

14. The sensor data evaluation system of claim 13, wherein the second sensor frontend is further configured to execute a machine-learning algorithm based on an evaluation of the first sensor frontend output and the second sensor data.

15. The sensor data evaluation system of claim 1, further comprising an estimated working conditions unit, configured to receive the first sensor frontend output from the first sensor frontend and to direct the first sensor frontend output to the second sensor frontend.

16. The sensor data evaluation system of claim 15, wherein the estimated working conditions unit further comprises one or more machine learning processors, configured to carry out a machine learning algorithm and to associate a condition context with the modification to the second sensor parameter.

17. A method of sensor data evaluation comprising:
    delivering first sensor data to a first sensor frontend;
    generating a first sensor frontend output corresponding to the first sensor data;
    delivering the first sensor frontend output to a second sensor frontend;
    receiving second sensor data from one or more second sensors;
    deriving a condition context from at least the first sensor frontend output, wherein the condition context is a condition that diminishes a function of the one or more second sensors; and
    sending a signal to the one or more second sensors based at least on the condition context, the signal representing an instruction to modify a second sensor data resolution, a sensor sampling rate, or a second sensitivity of the one or more second sensors.

* * * * *